Dec. 19, 1961  M. B. RIGGS  3,013,599
TUBELESS TIRE CHAFER
Filed Nov. 4, 1959
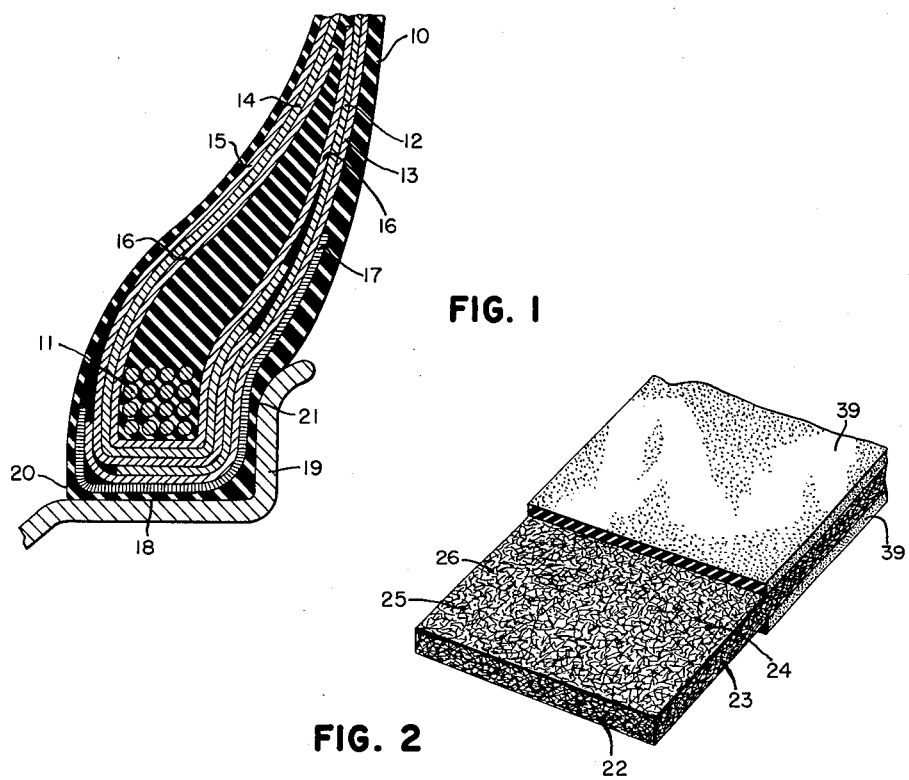
FIG. 1
FIG. 2
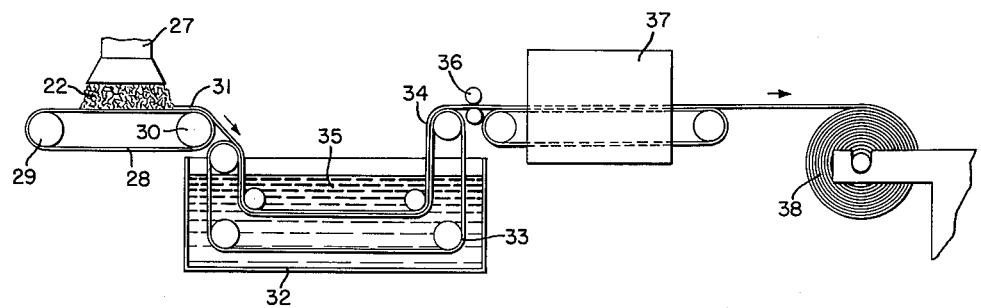
FIG. 3
INVENTOR.
MART B. RIGGS
BY
J. B. Holden
ATTORNEY 3,013,599
TUBELESS TIRE CHAFER
Mart B. Riggs, Akron, Ohio, assignor to The Goodyear Tire & Rubber Company, Akron, Ohio, a corporation of Ohio
Filed Nov. 4, 1959, Ser. No. 850,943
5 Claims. (Cl. 152—362)

This invention relates to an improved construction for a pneumatic tire and, more particularly, to improvements in the bead portion of a pneumatic tire of the tubeless variety for preventing inflationary air from escaping.

The development of pneumatic tubeless tires has led to tires designed to hold air without an innertube with the attendant disadvantages of hot running of the tire during road service and maintenance of the tube. To prevent the escape of air from such a tubeless tire, the carcass of the tire is made air impervious and special precautions are taken in the make up of the bead to prevent the escape of air from inside the tire casing through the bead area during road operation. Attention has been particularly directed to various types of air impervious chafer strips which extend around the bead of the tire for the purposes of reinforcing the bead and absorbing abrasion forces between the tire and that portion of the rim engaged by the bead of the tire. For example, heretofore, chafer strips have been used made of solid rubber, monofilament fabric, and impregnated cord fabric all of which are air impervious. While these and other expedients have proven successful in preventing air from passing between the tire bead and the rim, each of these air impervious chafers has disadvantages either in terms of manufacture of the chafer, incorporation into the tire, and/or operation of the tire. An all rubber chafer, for example, tends to flow from the bead area during molding of the tire requiring special precautions in the manufacture of the chafer. On the other hand, monofilament fabric chafers are not satisfactory because the monofilament crystallizes and ultimately fractures during operation of the tire. Cord chafers are not only extremely expensive, since the cords must be made air impervious, but also create problems during the building of the tire due to lack of strength of the chafer in a direction normal to the length of the cords.

It is an object of this invention to provide an improved chafer construction for pneumatic tubeless tires which comprise the desirable properties of dimensional stability, minimum cost and minimum temperature rise during operation while at the same time maintains resistance to loss of air through the carcass.

It is another object of this invention to accomplish these results in a manner which permits the fabrication of a tubeless tire in substantially the same manner that a pneumatic tire built for use with a tube is fabricated and which will retain normal air pressure.

In accordance with the present invention, there is provided a tubeless tire casing having a rubberized chafer strip adhered to the rim engaging faces of the bead which chafer is made of a plurality of unwoven fibers or filaments extending in unoriented or random disposition relative to each other, and having interstices filled with a rubbery material disposed in the interstices from a liquid vehicle or carrier.

The invention will be more readily understood and other objects will appear as the description proceeds in reference to the accompanying drawings, in which:

FIGURE 1 is an enlarged sectional view of the bead portion of a tubeless tire made according to this invention mounted on a rim.

FIGURE 2 is an enlarged perspective view of the chafer strip made according to this invention.

FIGURE 3 is a schematic view of an apparatus for making the chafer element shown in FIGURE 2.

Referring to the drawings, the invention is shown as applied to a tubeless tire having a bead portion 10 shown in FIGURE 1 in which is disposed the usual bead ring 11 encased in rubber and around which the reinforcing plies 12, 13, 14 and 15 are wrapped to anchor the reinforcing plies to provide a unitary structure. The reinforcing plies may be made of any suitable synthetic or natural fiber and consist of cords which extend from bead portion to bead portion with the endings of the outer plies 12 and 13 overlapping the inner plies 14 and 15. The bead rings 11 are provided with an inner reinforcing wrapper, or flipper 16, which encloses the bead ring and has its marginal portions extending radially outwardly of the bead ring 11. According to the usual practice, the reinforcing plies 12, 13, 14 and 15 have their opposite faces friction coated with a thin layer of rubber composition prior to incorporation into the tire. The chafer strips 17 are wrapped around the bead portions of the tire outwardly of the reinforcing plies to prevent the abrasion created between the bead base 18 and the rim 19 from chafing or fraying the reinforcing plies. The chafer 17 extends from the toe 20 of the bead portion of the tire to a location radially outwardly of the rim flange engaging portion or heel 21 of the tire. In accordance with this invention the chafer strip 17 consists of a plurality of unwoven staple filaments or fibers 22 of any suitable material including rayon, nylon, or cotton with the filaments or fibers 22 extending in random disposition relative to each other to form a thin mat-like web 23, as shown in FIGURE 2 of the drawings. The mat-like web 23 is normally pervious to air in a direction normal to the face 24 of the mat. Therefore, the interstices 25 existing between the filaments 22 are filled with an elastomeric or rubbery material 26 to thereby reduce the rate of diffusion of air through the web 23 in a direction parallel to the face 24 to substantially zero. The type of material 26 used to fill the interstices 25 in the mat is not critical for the purposes of this invention so long as such material does not degrade the fibers and adheres to unvulcanized rubber.

In practicing the invention, and with particular reference to FIGURE 3 of the drawings, the mat or web 23 is preferably made by blowing a plurality of fibers or filaments 22 from a duct 27 on to a conveyor belt 28 supported on the rolls 29 and 30. As the fibers 22 fall upon the surface of the conveyor 28 the fibers build up into a sheet 31 with the individual fibers 22 extending in random directions within the sheet 31. The sheet 31 is then conveyed into a dipping tank 32 by means of a conveyor 33, preferably made of wire mesh, so that as the impregnated sheet 34 emerges from the impregnating liquid 35, the excess liquid, removed by squeeze rolls 36, can drain into the tank 32. The sheet 34 is slowly passed through the tank 32 to insure that the liquid has thoroughly filled the interstices in between the filaments 22. The sheet 34 is then passed through a drying oven 37 wherein it is slowly dried at relatively low temperature, preferably less than 200° F., to avoid rapid removal of the vehicle or carrier for the rubbery material 26. After passage through the drying oven 37 the sheet 34 may be rolled upon itself to form a roll 38 which is subsequently rubberized by calendering in the conventional manner with a layer of rubber 39 on both sides of the impregnated sheet 34. After calendering, the sheets are cut to suitable dimensions in accordance with usual tire manufacturing procedure to form the chafer strips 17.

The filaments 22 forming the web 31 may be any natural or synthetic material, such as cotton, rayon, nylon and Dacron, and are staple fibers having a substantial length, preferably within the range of ½ to 2", and having a fairly low denier, preferably between 2 and 5 denier. The sheet 31 is, of course, relatively thick prior to being passed through the tank 32, but after passing through the squeeze rolls 36, the thickness is substantially reduced and the filament layer compacted so that the sheet, as it passes through the oven 37, is approximately 1/16" in thickness and has an overall weight of approximately 7 oz. per sq. yd. after drying.

The impregnating liquid 35 is composed of a liquid carrier or vehicle in which is dissolved, suspended or dispersed the elastomeric or rubbery material 26. Since the liquid phase of the impregnating liquid 35 is driven off or evaporated in the drying oven 37, the function of the liquid is to carry and deposit the solid rubbery material into the interstices of the web 31. The liquid is of low viscosity, and is preferably aqueous, when latex particles are used, and in the event that a rubber solution is used, the liquid phase may comprise any suitable rubber solvent. As indicated, the type of material 26 within the liquid phase of the impregnating liquid 35 is not critical for the purposes of this invention so long as such material does not degrade the fibers 22 and adheres to unvulcanized rubber. The impregnating liquid 35 may comprise a latex, a solution of a compounded rubber in any suitable commercial solvent, or a latex together with a material to increase adhesion of rubber to textile fibers. Examples of the rubber latices which may be employed are natural rubber latices and the synthetic rubber latices, for example, latices resulting from the polymerization of butadiene with styrene, and butadiene with vinyl pyridine. Examples of the materials which may be added to improve the adhesion to textiles are various aldehydes, such as formaldehyde, acetaldehyde, butylaldehyde, furfuryl butyraldehyde and complementary resin forming reactants, such as phenols or phenolic compounds, such as resorcinol, naphthol, cresol, phenol, and amines, such as analine, cyanamid and urea. The chafer strip 17 is incorporated into the bead portion 10 in the usual manner by placing the chafer 17 in face to face contact with the outermost reinforcing ply 12 so that the chafer 17 is in position to receive any chafing or wearing between the bead portion 21 and the rim 19. In employing chafer strips made according to this invention, no special care or precautions need be taken in the building operations since the chafer 17 has substantial strength longitudinally and transversely thereof and are readily adhered to the bead portion 10 via the calender rubber coat 39.

Chafer strips made according to this invention have been tested with regard to the diffusion of air in the plane of the mat 23 or parallel to the surface 24, by subjecting the strips 17 to the air diffusion test outlined in ASTM procedure D-122-37. It was found that the chafers 17 had a zero air diffusion rate when subjected to 30 p.s.i. air pressure for a period of 24 hours.

Furthermore, because of the strength of the chafers 17 in all directions parallel to the plane thereof, the chafers may be applied to the tire under considerable tension. At the same time during curing of the tire, no difficulties arise with regard to the flow of rubber away from the toe of the bead because the chafer strips of this invention have dimensional stability. Not only are these economies in the building of tubeless tires effected but further economies are provided because the chafer of this invention is made from unwoven staple fiber which is a relatively inexpensive, readily available material, and can be more cheaply processed and made into chafer strips according to this invention than was heretofore possible.

While certain representative embodiments and details have been shown for the purpose of illustrating the invention, it will be apparent to those skilled in this art that various changes and modifications may be made therein without departing from the spirit or scope of the invention.

What is claimed is:

1. An inflatable tubeless tire comprising a hollow annular body of resilient rubbery material reinforced with cord fabric and having beads at the inner periphery which are adapted to seat on a rim so that the tire and rim form an air chamber, each of said beads having a chafer terminating at one edge at a location adjacent to the toe portion of the bead and at the other edge at a location adjacent to the sidewall of the tire to form a support for the surfaces of the beads resting on the rim, said chafer comprising a thin mat made of staple fibers extending in random disposition in said mat, the fibers of said mat laying upon each other forming a multiplicity of interstices, whereby in the untreated condition said mat is normally pervious to air parallel to its surfaces, said interstices being filled with an impregnant of rubbery material in sufficient quantity to bar the passage of air in a direction parallel to the surface of said mat.

2. An inflatable tubeless tire comprising a hollow annular body of resilient rubbery material reinforced with cord fabric and having beads at the inner periphery which are adapted to seat on a rim so that the tire and rim form an air chamber each of said beads having a chafer terminating at one edge at a location adjacent to the toe portion of the bead and at the other edge at a location adjacent to the sidewall of the tire to form a support for the surfaces of the beads resting on the rim, said chafer being made of compact layers of fibers extending in random disposition forming a thin mat, said mat being impregnated with a rubbery material in sufficient quantity to bar the passage of air along the length of said web.

3. An inflatable tubeless tire comprised of a hollow annular body of resilient rubbery material reinforced with cord fabric and having beads at the inner periphery thereof which are adapted to seat on a rim so that the tire and rim form an air chamber, each of said beads having a chafer terminating at one edge at a location adjacent to the toe portion of the bead and at the other edge at a location adjacent to the sidewall of the tire to form a support for the surfaces of the beads resting on the rim, said chafer comprising a mat of compacted staple textile fibers which extend in random disposition within said mat and laying in contact with each other to form minute interstices, said interstices being filled with an impregnant of rubbery material in sufficient quantity to reduce the air diffusion rate parallel to the surface of said mat to substantially zero.

4. An inflatable tubeless tire comprised of a hollow annular body of resilient rubbery material reinforced with cord fabric and having beads at the inner periphery thereof which are adapted to seat on a rim so that the tire and rim form an air chamber, each of said beads having a chafer terminating at one edge at a location adjacent to the toe portion of the bead and at the other edge at a location adjacent to the sidewall of the tire to form a support for the surfaces of the beads resting on the rim, said chafer comprising short lengths of textile filaments laid upon each other in random disposition to form a dense mat-like web, said filaments forming minute interstices within said web which are filled with an impregnant of rubbery material which bonds readily to textiles and rubber in an amount sufficient to reduce the air diffusion rate parallel to the surfaces of said web to substantially zero.

5. A tubeless tire as claimed in claim 4 in which said chafer is skim coated with unvulcanized rubber prior to incorporation into the bead of the tire.

References Cited in the file of this patent

UNITED STATES PATENTS

| | | |
|---|---|---|
| 2,056,012 | Madge et al. | Sept. 29, 1936 |
| 2,843,505 | Riedel | July 15, 1958 |
| 2,931,749 | Kine et al. | Apr. 5, 1960 |
| 2,937,684 | Rockoff | May 24, 1960 |

FOREIGN PATENTS

| | | |
|---|---|---|
| 570,919 | Great Britain | July 27, 1945 |
| 1,153,791 | France | Oct. 14, 1957 |

OTHER REFERENCES

Continental, German Application 1,029,693, printed May 8, 1958 (Kl 63e).